(12) United States Patent
Saito et al.

(10) Patent No.: US 7,171,803 B2
(45) Date of Patent: Feb. 6, 2007

(54) EXHAUST GAS PURIFICATION SYSTEM OF INTERNAL COMBUSTION ENGINE

(75) Inventors: Makoto Saito, Okazaki (JP); Shigeto Yahata, Obu (JP)

(73) Assignee: Denso Corporation, Kariya (JP)

( * ) Notice: Subject to any disclaimer, the term of this patent is extended or adjusted under 35 U.S.C. 154(b) by 74 days.

(21) Appl. No.: 11/054,552

(22) Filed: Feb. 10, 2005

(65) Prior Publication Data

US 2005/0188686 A1 Sep. 1, 2005

(30) Foreign Application Priority Data

Feb. 27, 2004 (JP) .............................. 2004-053640

(51) Int. Cl.
*F01N 3/00* (2006.01)
*F01N 3/02* (2006.01)
(52) U.S. Cl. .......................................... 60/297; 60/311
(58) Field of Classification Search ................... 60/297, 60/311
See application file for complete search history.

(56) References Cited

U.S. PATENT DOCUMENTS 5,063,736 A * 11/1991 Hough et al. ................. 60/286
6,634,170 B2 * 10/2003 Hiranuma et al. ............. 60/295
6,827,754 B2 * 12/2004 Suwabe et al. ................ 55/523
6,829,889 B2 * 12/2004 Saito et al. .................... 60/291
6,901,751 B2 * 6/2005 Bunting et al. ................ 60/297
2003/0097834 A1 * 5/2003 Gabe et al. .................... 60/297
2003/0230060 A1 * 12/2003 Yahata et al. ................ 55/282.3
2004/0123586 A1 * 7/2004 Kuboshima et al. .......... 60/277
2004/0204818 A1 * 10/2004 Trudell et al. ............... 701/114

FOREIGN PATENT DOCUMENTS

JP 7-317529 12/1995
JP 7-332065 12/1995

* cited by examiner

*Primary Examiner*—Thomas Denion
*Assistant Examiner*—Loren Edwards
(74) *Attorney, Agent, or Firm*—Nixon & Vanderhye P.C.

(57) ABSTRACT

An electronic control unit (ECU) calculates a pressure loss in an exhaust passage downstream of a diesel particulate filter (DPF) fluctuating in accordance with an operating state of an engine based on the operating state as a pressure loss in the exhaust passage constituting a part of a difference between an atmospheric pressure and an absolute pressure of exhaust gas flowing through the DPF. The ECU converts a mass flow rate of the exhaust gas flowing through the DPF into a volumetric flow rate based on the obtained absolute pressure. Thus, the volumetric flow rate can be calculated correctly regardless of fluctuation in the operating state, and a deposition state of exhaust particulate matters can be calculated highly accurately. Thus, regeneration of the DPF can be performed at appropriate timing.

8 Claims, 4 Drawing Sheets

EXHAUST GAS PURIFICATION SYSTEM OF INTERNAL COMBUSTION ENGINE

CROSS REFERENCE TO RELATED APPLICATION

This application is based on and incorporates herein by reference Japanese Patent Application No. 2004-53640 filed on Feb. 27, 2004.

BACKGROUND OF THE INVENTION

1. Field of the Invention

The present invention relates to an exhaust gas purification system of an internal combustion engine. Specifically, the present invention relates to a technology for regenerating a particulate filter.

2. Description of Related Art

In recent years, reduction of exhaust emission of internal combustion engines installed in automobiles and the like has been required. Specifically, in a compression ignition diesel engine using light oil as fuel, it is required to eliminate not only gases such as carbon monoxide, hydrocarbon and nitrogen oxides, but also exhaust particulate matters such as soot and soluble organic fractions contained in exhaust gas. Therefore, a particulate filter is disposed in an exhaust passage for collecting the exhaust particulate matters in the exhaust gas.

If the exhaust gas flows into the particulate filter, the exhaust gas passes through porous partition walls of the particulate filter. At that time, the exhaust particulate matters contained in the exhaust gas are collected at surfaces and pores of the partition walls. If a quantity of the collected and deposited particulate matters increases excessively, a flow resistance in the particulate filter will increase and a back pressure of the engine will increase. As a result, an output of the engine will be deteriorated. Therefore, the exhaust particulate matters deposited on the particulate filter should be occasionally eliminated from the particulate filter to regenerate the particulate filter.

A certain system capable of performing the regeneration of the particulate filter during operation of the engine utilizes an oxidizing property of an oxidation catalyst such as platinum disposed on the particulate filter. The system performs post-injection for supplying the fuel to the particulate filter in an exhaustion stroke, for instance. Thus, the system oxidizes and eliminates the deposited exhaust particulate matters, which are more difficult to oxidize than the injected fuel, by utilizing combustion heat of the fuel.

If the regeneration of the particulate filter is performed frequently, a fuel cost will increase. If a time interval to the next regeneration is too long, the quantity of the deposited exhaust particulate matters will increase excessively, and the deposited exhaust particulate matters will be suddenly burned in the regeneration process. In such a case, there is a possibility that the particulate filter is heated to abnormally high temperature and is damaged. Therefore, regeneration timing of the particulate filter should be preferably decided by determining a deposition state (a deposited quantity) of the exhaust particulate matters. Flow resistance in the particulate filter increases as the quantity of the exhaust particulate matters deposited in the particulate filter increases. A differential pressure between an inlet and an outlet of the particulate filter increases if the flow resistance increases. Therefore, a system disclosed in Unexamined Japanese Patent Application Publication No. H07-332065 (Patent Document 1) measures the differential pressure across the particulate filter, and determines that the timing for performing the regeneration is reached if the differential pressure exceeds a predetermined value. The differential pressure of the particulate filter changes in accordance with a flow rate of the exhaust gas flowing through the particulate filter. Therefore, a system disclosed in Unexamined Japanese Patent Application Publication No. H07-317529 (Patent Document 2) converts the measured differential pressure into a value corresponding to a predetermined flow rate of the exhaust gas. The technology of Patent Document 2 calculates the present flow rate of the exhaust gas, which is necessary in the conversion, based on a cylinder volume, engine rotation speed and exhaust gas temperature of the engine.

However, a flowing state of the exhaust gas in the exhaust passage, through which the exhaust gas flows, is complicated. Therefore, there is a possibility that the technology of Patent Document 2 cannot properly determine the regeneration timing.

SUMMARY OF THE INVENTION

It is therefore an object of the present invention to provide an exhaust gas purification system of an internal combustion engine capable of properly determining regeneration timing of a particulate filter.

According to an aspect of the present invention, an exhaust gas purification system of an internal combustion engine includes a particulate filter disposed in an exhaust passage of the engine for collecting exhaust particulate matters. The exhaust gas purification system calculates an deposition state of the exhaust particulate matters deposited in the particulate filter based on operating states of the engine including a differential pressure between an inlet and an outlet of the particulate filter to determine whether the particulate filter should be regenerated or not. The exhaust gas purification system includes measuring means, converting means, and deposition state calculating means. The measuring means measures an absolute pressure of exhaust gas flowing through the particulate filter. The converting means converts a mass flow rate of the exhaust gas flowing through the particulate filter into a volumetric flow rate based on the absolute pressure. The deposition state calculating means calculates the deposition state based on the volumetric flow rate and the differential pressure. The measuring means includes pressure loss calculating means for calculating a pressure loss in the exhaust passage downstream of the particulate filter as a pressure loss in the exhaust passage constituting a part of a difference between the absolute pressure and an atmospheric pressure, based on the operating states of the engine.

The volumetric flow rate of the exhaust gas flowing through the particulate filter depends on the absolute pressure of the exhaust gas. The pressure loss in the exhaust passage downstream of the particulate filter fluctuating in accordance with the operating states of the engine is calculated as the pressure loss in the exhaust passage constituting a part of the difference between the absolute pressure and the atmospheric pressure. Thus, the deposition state of the exhaust particulate matters can be calculated further accurately. As a result, the regeneration of the particulate filter can be performed at further appropriate timing.

According to another aspect of the present invention, an exhaust gas purification system of an internal combustion engine includes temperature distribution measuring means and deposition state calculating means. The temperature distribution measuring means measures a temperature distribution inside the particulate filter. The deposition state calculating means calculates a deposition state of the exhaust particulate matters from a present mass flow rate of the exhaust gas and the temperature distribution, based on a correspondence relating the deposition state to the mass flow rate of the exhaust gas flowing through the exhaust passage and the temperature distribution. The correspondence is set based on a flow model of the exhaust gas in the particulate filter. The flow model of the exhaust gas assumes that a pressure loss caused when the exhaust gas permeates a partition wall of the particulate filter and the deposition state of the exhaust particulate matters are uniform among respective portions of the particulate filter.

In the case where the temperature distribution inside the particulate filter is not uniform, the volumetric flow rate of the exhaust gas in the particulate filter varies in accordance with the temperature distribution. By determining the deposition state of the exhaust particulate matters based on the flow model considering the temperature distribution, the regeneration of the particulate filter can be performed at appropriate timing.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS (First Embodiment)

Figure 1:
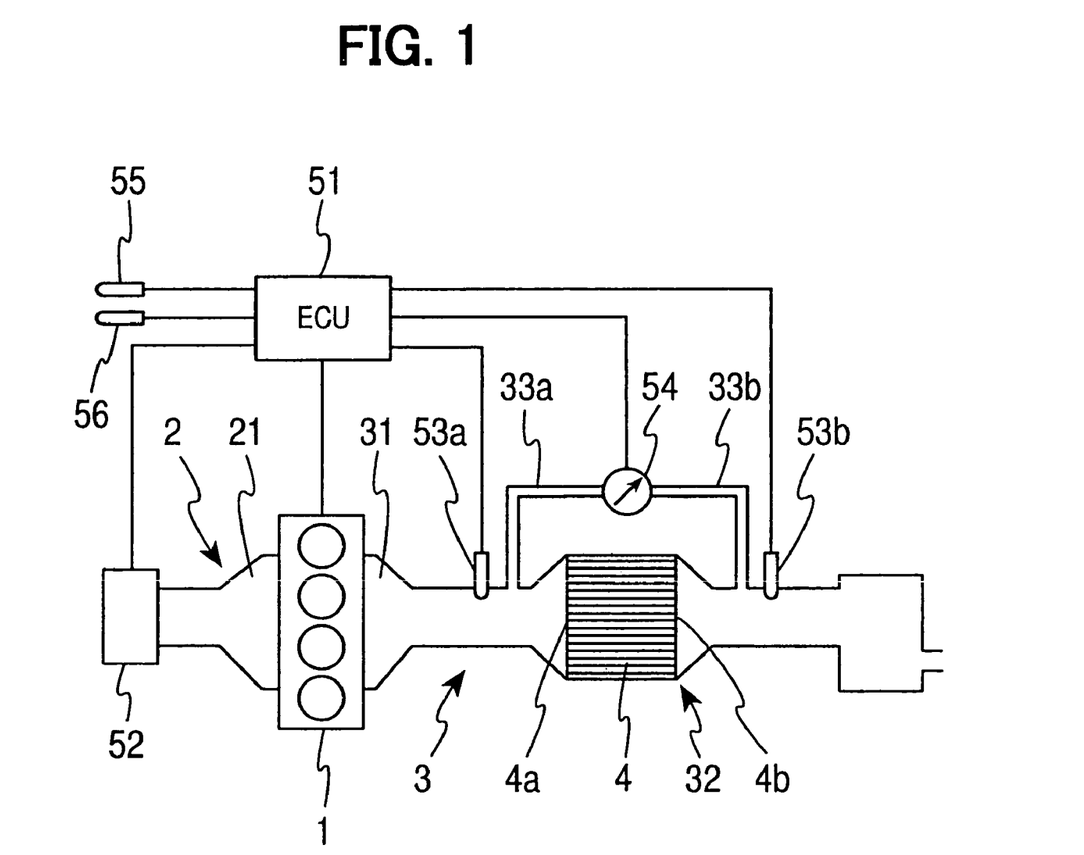
FIG. 1 is a schematic diagram showing an internal combustion engine having an exhaust gas purification system according to a first embodiment of the present invention.

Referring to FIG. 1, a diesel engine having an exhaust gas purification system according to a first embodiment of the present invention is illustrated.

An engine main body 1 of the diesel engine shown in FIG. 1 is equipped with four cylinders. The engine main body 1 is connected with an intake manifold 21 as the most downstream portion of an intake passage 2 and with an exhaust manifold 31 as the most upstream portion of an exhaust passage 3. The exhaust passage 3 is connected with a particulate filter (a diesel particulate filter: DPF) 32 at a gathering portion of the exhaust manifold 31. A main body 4 of the DPF 32 is a honeycomb structure, which is made of a porous ceramic such as cordierite or silicon carbide and is formed in the shape of a circular column. An opening of each passage of the honeycomb structure is blocked on an end side thereof in an axial direction. Exhaust gas discharged from the cylinders of the engine main body 1 enters the DPF main body 4 through an inlet 4a, which opens in an end of the DPF main body 4. Then, the exhaust gas flows in the axial direction along a porous partition wall inside the DPF main body 4 and permeates and passes through the partition wall. Then, the exhaust gas flows toward a downstream portion of the exhaust passage 3 through an outlet 4b opening in the other end of the DPF main body 4. At that time, exhaust particulate matters contained in the exhaust gas are collected and deposited by the DPF 32. A quantity of the collected and deposited exhaust particulate matters increases in accordance with a travel distance. An oxidation catalyst, of which main components are noble metals such as platinum or palladium, is supported on the surface of the DPF main body 4. The oxidation catalyst oxidizes and combusts the exhaust particulate matters under a predetermined temperature condition to eliminate the exhaust particulate matters.

An electronic control unit (ECU) 51 for controlling various parts of the engine such as injectors of the engine main body 1 is provided.

Various types of signals indicating operating states are inputted to the ECU 51. Sensors for measuring a quantity of the exhaust particulate matters deposited in the DPF 32 (a PM deposition quantity) are provided, and signals for measuring the PM deposition quantity are also inputted to the ECU 51. More specifically, temperature sensors 53a, 53b are mounted to the exhaust passage 3 so that the temperature sensors 53a, 53b penetrate a pipe providing the exhaust passage 3. Thus, the temperature sensors 53a, 53b sense the temperature of the exhaust gas. The temperature sensor 53a is disposed immediately upstream of the DPF 32 and the temperature sensor 53b is disposed immediately downstream of the DPF 32. The temperature sensed by the temperature sensor 53a can be regarded as the temperature of the exhaust gas at the inlet 4a of the DPF main body 4, or DPF inlet temperature. The temperature sensed by the temperature sensor 53b can be regarded as the temperature of the exhaust gas at the outlet 4b of the DPF main body 4, or DPF outlet temperature.

The exhaust passage 3 is connected with a first branch passage 33a branching from the exhaust passage 3 at a point immediately upstream of the DPF 32 and with a second branch passage 33b branching from the exhaust passage 3 at a point immediately downstream of the DPF 32. A differential pressure sensor 54 as differential pressure sensing means interposed between the first and second branch passages 33a, 33b senses a differential pressure between the inlet 4a and the outlet 4b of the DPF 32. The differential pressure indicates a pressure loss at the DPF 32.

An air flow meter 52 is disposed upstream of the intake manifold 21 in the intake passage 2. The air flow meter 52 senses a flow rate of intake air.

A pressure sensor is mounted on a lower side of a vehicle as an atmospheric pressure sensor 55 for sensing an atmospheric pressure of ambient air, or a pressure in an atmosphere in which the exhaust passage 3 is disposed. A temperature sensor is mounted on the lower side of the vehicle as an ambient temperature sensor 56 for sensing ambient temperature.

Parameters indicating operating states such as an accelerator position and cooling water temperature are inputted to the ECU 51.

The ECU 51 has general structure centering on a microcomputer. ROM of the ECU 51 stores control programs for controlling various parts of the engine and arithmetic programs for calculating the PM deposition quantity. It is determined whether the DPF 32 should be regenerated based on the calculated PM deposition quantity.

Figure 2:
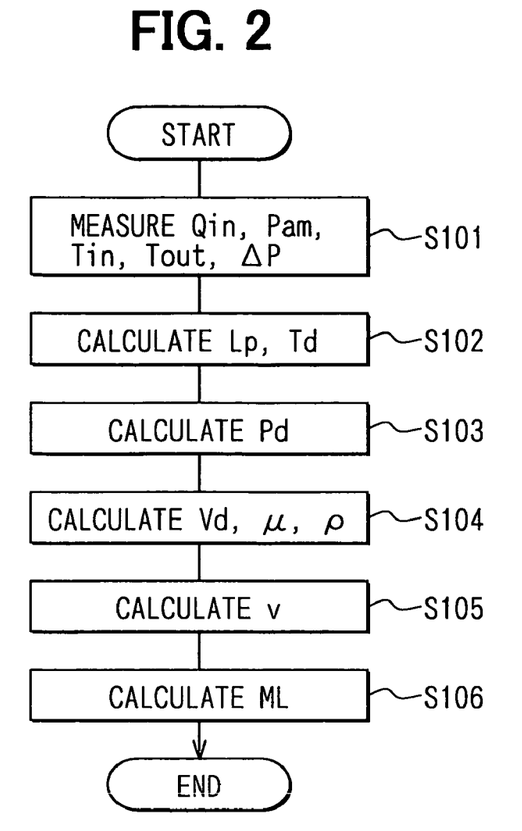
FIG. 2 is a flowchart showing steps of control performed by an electronic control unit of the engine according to the first embodiment.

Next, control of the regeneration of the DPF 32 performed by the ECU 51 will be explained based on a flowchart shown in FIG. 2.

First, in Step S101, the intake air flow rate Qin, the DPF pressure loss ΔP, the DPF inlet temperature Tin, the DPF outlet temperature Tout, and the atmospheric pressure Pam are inputted. The intake air flow rate Qin is a mass flow rate.

Then, in Step S102, DPF temperature Td as representative temperature inside the DPF 32 is calculated based on the DPF inlet temperature Tin and the DPF outlet temperature Tout. Since the DPF inlet temperature Tin fluctuates largely, the DPF inlet temperature Tin should be preferably used after first-order lag filtering process is executed. In Step S102, also a downstream exhaust pipe pressure loss Lp (a pressure loss in the exhaust passage 3 downstream of the DPF 32) is calculated based on a following formula (1).

$$Lp(kPa)=[Qin(g/sec)/28.8(g/mol)]\times 22.4\times 10^{-3}(m^3/mol)\times [Tout(K)/273(K)]\times \alpha, \quad (1)$$

The sign α in the formula (1) is a downstream exhaust pipe pressure loss coefficient, which is adjusted through experiment beforehand. In the above calculation shown by the formula (1), the intake air flow rate Qin is converted into a volumetric flow rate at a portion downstream of the DPF 32 and is multiplied by the downstream exhaust pipe pressure loss coefficient α. In the above calculation, the DPF outlet temperature Tout is used as representative temperature of the portion downstream of the DPF 32.

Then, in Step S103, a representative absolute pressure (a DPF absolute pressure) Pd of the exhaust gas in the DPF main body 4 is calculated based on a following formula (2).

$$Pd (kPa)=Pam(kPa)+Lp(kPa)+\Delta P(kPa)\times (\tfrac{1}{2}), \quad (2)$$

The formula (2) calculates the DPF absolute pressure Pd based on the fact that the absolute pressure at the inlet 4a of the DPF main body 4 coincides with the summation of the atmospheric pressure Pam (kPa), the downstream exhaust pipe pressure loss Lp (kPa), and the DPF pressure loss ΔP, and that the absolute pressure at the outlet 4b of the DPF main body 4 coincides with the summation of the atmospheric pressure Pam (kPa) and the downstream exhaust pipe pressure loss Lp (kPa). The coefficient of the third item of the right-hand side of the formula (2) is ½ so that the DPF absolute pressure Pd becomes an intermediate value between the absolute pressures at the inlet 4a and the outlet 4b of the DPF main body 4.

Then, in Step S104, a DPF volumetric flow rate Vd, or a volumetric flow rate of the exhaust gas flowing through the DPF 32, is calculated based on a following formula (3).

$$Vd(m^3/sec)=[Qin(g/sec)/28.8(g/mol)]\times 22.4\times 10^{-3}(m^3/Mol)\times [Td(K)/273(K)]\times [Pam(kPa)/Pd(kPa)], \quad (3)$$

The formula (3) converts the mass flow rate of the exhaust gas into the volumetric flow rate Vd on an assumption that the mass flow rate of the intake air (the intake air flow rate Qin) coincides with the mass flow rate of the exhaust gas.

In Step S104, viscosity μ of the exhaust gas is also calculated in accordance with the DPF temperature Td, based on a predetermined formula or a map. Generally, the viscosity μ of the exhaust gas increases as the temperature increases.

In Step S104, density ρ of the exhaust gas is also calculated in accordance with the DPF temperature Td, based on a predetermined formula or a map. Generally, the density ρ of the exhaust gas decreases as the temperature increases.

Then, in Step S105, the volumetric flow rate of the exhaust gas (the DPF volumetric flow rate Vd) is converted into flow velocity v of the exhaust gas by dividing the DPF volumetric flow rate vd by an effective passage area of the DPF 32.

Then, in Step S106, the quantity of the deposited exhaust particulate matters (the PM deposition quantity ML) is calculated based on a following formula (4) stored in the ROM. Signs K1, H1, K2, H2 are constants.

$$ML=[\Delta P-(K1\mu v+H1\rho v^2)]/(K2\mu v+H2\rho v^2), \quad (4)$$

The formula (4) is a model for associating the PM deposition quantity ML with the flowing state of the exhaust gas at the DPF 32. The formula (4) uses the exhaust gas flow velocity v as a parameter. It is difficult to directly measure the flow velocity v or to directly measure the volumetric flow rate of the exhaust gas to obtain the exhaust gas flow velocity v. Therefore, in the present embodiment, the DPF pressure loss ΔP and the downstream exhaust pipe pressure loss Lp are obtained based on the flowing state in the DPF 32 and the mass flow rate of the exhaust gas is converted into the volumetric flow rate Vd. Thus, the volumetric flow rate Vd of the exhaust gas at the particulate filter 32 can be calculated and the PM deposition quantity ML can be calculated correctly, without complicating the structure.

The calculated PM deposition quantity ML is compared with a reference value. If the PM deposition quantity ML exceeds the reference value, the DPF 32 is regenerated by performing post-injection for supplying the fuel to the particulate filter in an exhaustion stroke for a predetermined period, for instance.

A part of the DPF absolute pressure Pd corresponding to the DPF pressure loss ΔP can be calculated by multiplying the DPF pressure loss ΔP by ½ or by multiplying the DPF pressure loss ΔP by a coefficient χ ($0<X\leq 1$). The coefficient χ is adjusted in accordance with the coefficients K1, H1, K2, H2 of the formula (4), inner structure of the DPF 32 and the like. In order to improve accuracy, a pressure at a pressure centroid inside the DPF 32 should be preferably used in the calculation of the PM deposition quantity ML as the pressure (the absolute pressure) inside the DPF 32.

The quantity of the exhaust gas flowing through the cell gradually decreases from the inlet 4a side toward the outlet 4b side. Therefore, pipe friction per unit length caused when the exhaust gas flows through the cell gradually decreases toward the outlet 4b side. More specifically, a decreasing rate of the pressure value decreases toward the outlet 4b side. Therefore, the pressure at the pressure centroid inside the DPF 32 does not exactly coincide with the summation of the pressure at the outlet 4b of the DPF 32 and the half of the DPF pressure loss ΔP, or an average of the pressures at the DPF inlet 4a and the DPF outlet 4b. The relationships among the DPF differential pressure ΔP, the pressure at the pressure centroid and the information such as the operating state of the diesel engine, the mass flow rate of the exhaust gas and the temperature inside the DPF 32 are obtained beforehand, and the ECU is endowed with a function of calculating a coefficient k. Thus, the coefficient k is set based on the operating state, the mass flow rate of the exhaust gas and the temperature inside the DPF 32, and the DPF differential pressure ΔP is multiplied by the coefficient k during the travel and the like in which the diesel engine operates. Thus, the pressure value inside the DPF 32 suitable as the representative value of the pressure inside the DPF 32 can be determined. Thus, the pressure of the exhaust gas passing through the layer of the exhaust particulate matters (the PM deposition layer) can be calculated highly accurately and the deposition quantity ML of the exhaust particulate matters can be calculated highly accurately.

Figure 3:
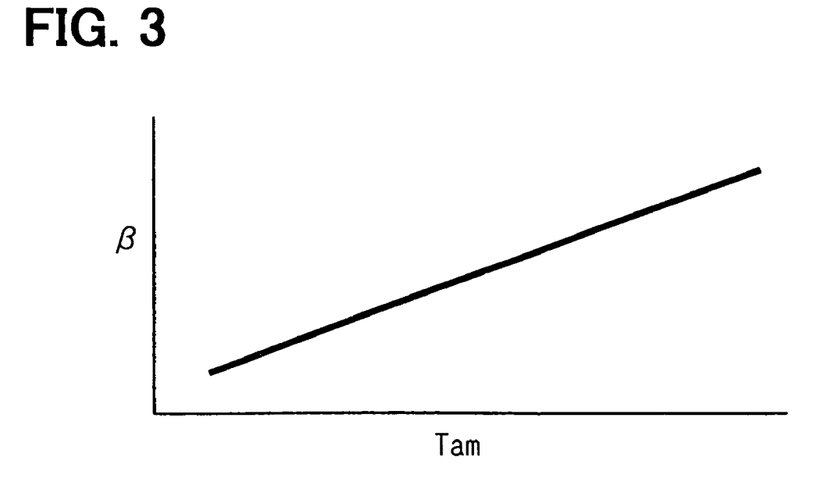
FIG. 3 is a graph showing a relationship between ambient temperature and a correction coefficient of a modified example of the first embodiment.

The downstream exhaust pipe pressure loss Lp may be calculated based on a following formula (5) by using a correction coefficient β, which depends on the ambient temperature Tam, in addition to the constant coefficient α. The temperature of the exhaust gas decreases as the exhaust gas flows downstream because of the ambient temperature Tam. By using the ambient temperature Tam, a temperature gradient in the exhaust passage 3 downstream of the DPF 32 can be estimated and the temperature in the exhaust passage 3 downstream of the DPF 32 can be grasped without disposing many temperature sensors there. As shown in FIG. 3, the correction coefficient β is increased as the ambient temperature Tam increases because the volume of the exhaust gas increases as the ambient temperature Tam increases.

$$Lp(kPa)=[Q\text{in}(g/\sec)/28.8(g/\text{mol})]\times 22.4\times 10^{-3}(m^3/\text{mol})\times [T\text{out}(K)/273(K)]\times\alpha\times\beta, \quad (5)$$

In the present embodiment, the PM deposition quantity ML is calculated based on the DPF pressure loss ΔP, the volumetric flow rate Vd, the viscosity μ and the density ρ. The viscosity μ and the density ρ are calculated from the DPF inlet temperature Tin and the DPF outlet temperature Tout. Then, it is determined whether the regeneration is necessary or not based on the PM deposition quantity ML. Any other formula equivalent to the formula (4) may be employed. For instance, coefficients M, N may be set so that a value ΔP(v, μ, ρ) calculated by a following equation: ΔP(v, μ, ρ)=Mμv+Nρv² corresponds to a reference PM deposition quantity at which the regeneration becomes necessary, and it may be determined whether the DPF pressure loss ΔP is "equal to or greater than" the value ΔP(v, μ, ρ). If the regeneration is unnecessary, the DPF pressure loss ΔP becomes less than the value ΔP(v, μ, ρ), and negative determination is provided. If the regeneration is necessary, the DPF pressure loss ΔP becomes equal to or greater than the value ΔP(v, μ, ρ), and affirmative determination is provided.

As explained above, in the present embodiment, the absolute pressure Pd of the exhaust gas flowing through the DPF 32 is measured by calculating the sum of the pressure loss Lp at the exhaust passage 3 downstream of the DPF 32 and the pressure value at the pressure centroid of the pressure distribution between the inlet 4a side and the outlet side 4b of the DPF 32. Then, the volumetric flow rate Vd of the exhaust gas flowing through the DPF 32 is calculated by using the summed pressure value (the absolute pressure). Compared to the case where the pressure value (the absolute pressure) is calculated by summing the pressure loss Lp at the exhaust passage 3 downstream of the DPF 32 and the pressure value (the differential pressure ΔP) between the inlet 4a side and the outlet 4b side of the DPF 32, the highly accurate exhaust gas volumetric flow rate Vd near the actual flow rate of the exhaust gas flowing through the DPF 32 can be obtained. Based on the calculated exhaust gas volumetric flow rate Vd, the deposition state of the exhaust particulate matters deposited in the DPF 32 can be calculated highly accurately.

(Second Embodiment)

Next, control performed by an ECU of an exhaust gas purification system of an internal combustion engine according to a second embodiment of the present invention will be explained based on a flowchart shown in FIG. 4.

Figure 4:
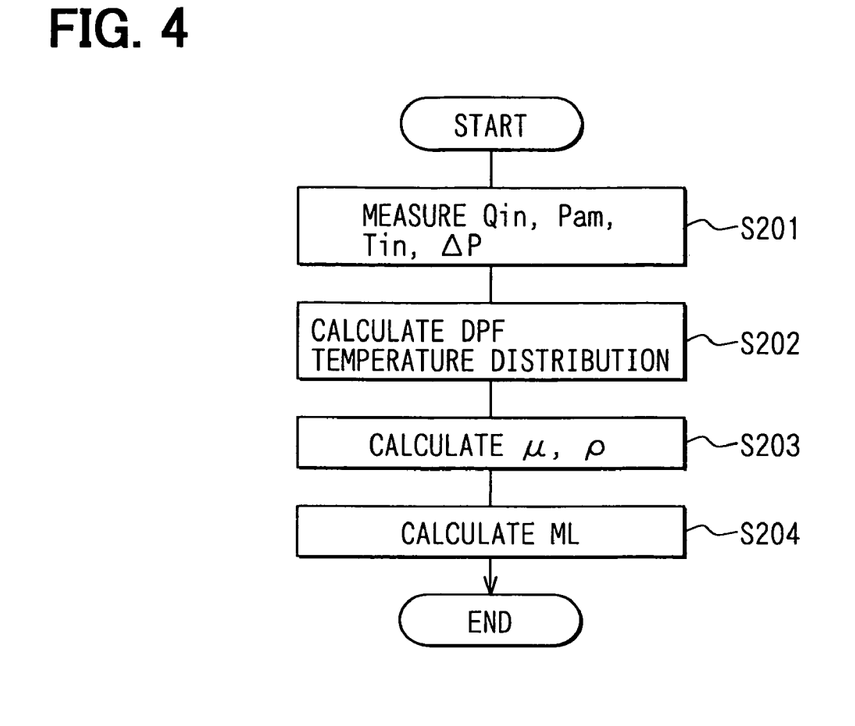
FIG. 4 is a flowchart showing steps of control performed by an electronic control unit of an internal combustion engine having an exhaust gas purification system according to a second embodiment of the present invention.
Figure 5:
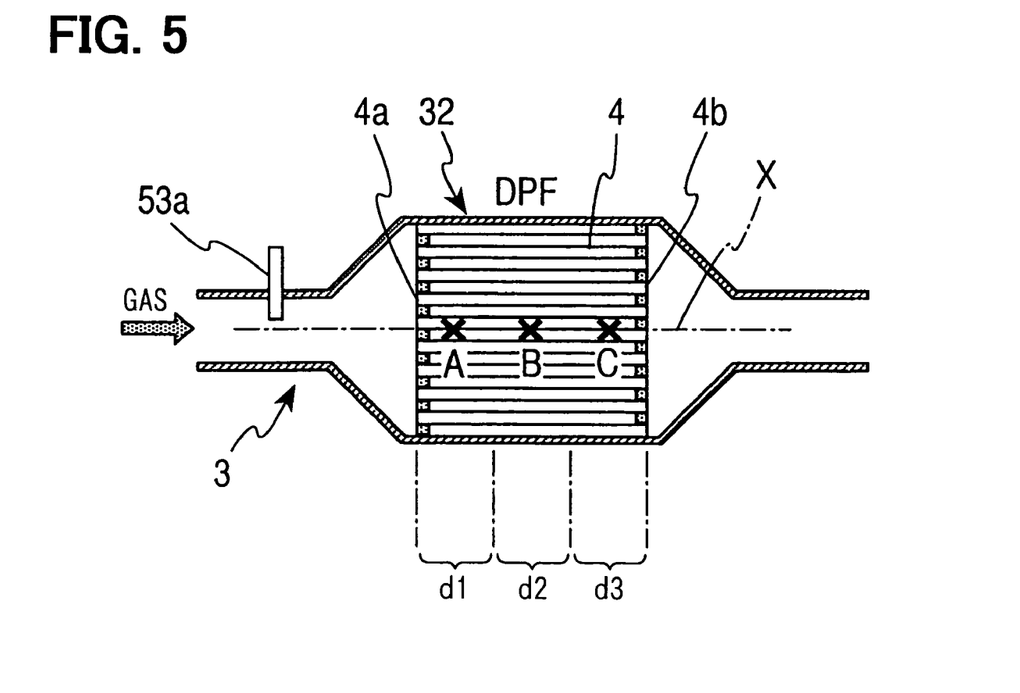
FIG. 5 is a longitudinal sectional view showing a neighborhood of a particulate filter of the exhaust gas purification system according to the second embodiment.

In Step S201 of the flowchart of FIG. 4, the intake air flow rate Qin, the atmospheric pressure Pam, the exhaust gas temperature (the DPF inlet temperature Tin), and the DPF pressure loss ΔP are measured as in Step S101 of the first embodiment. Then, in Step S202, a temperature distribution inside the DPF 32 is calculated based on the measured exhaust gas temperature Tin. As shown in FIG. 5, the DPF main body 4 is divided into three domains d1, d2, d3 along a central axis X of the DPF main body 4 from the inlet 4a side toward the outlet 4b side, and representative temperatures of the three domains d1, d2, d3 are estimated. Thus, the temperature distribution is obtained. Sizes of the three domains d1, d2, d3 in the direction of the central axis X are substantially the same as each other, for instance. The domains d1, d2, d3 are arranged in that order from the inlet 4a side of the DPF 32.

The representative temperatures of the three domains d1, d2, d3 are estimated based on the DPF inlet temperature Tin. Points A, B, C for estimating the representative temperatures are respectively set in the domains d1, d2, d3 on the central axis X as shown in FIG. 5. The signs A, B, C also denote the temperatures at the points A, B, C respectively.

A model expressed by a following formula (6) is used to estimate the temperatures A, B, C at the points A, B, C. The model uses the DPF input temperature Tin as an input. The formula (6) is a transfer function T(s) consisting of a first-order lag and a dead time. In the transfer function T(s), T denotes a time constant and L is the dead time.

$$T(s)=[1/(1+Ts)]\times e^{-Ls}, \quad (6)$$

Changes in the temperatures A, B, C can be regarded as step responses to the DPF inlet temperature Tin. More specifically, if the DPF inlet temperature Tin, or the temperature of the exhaust gas entering the DPF 32, changes stepwise, the change reaches the points A, B, C. Since it takes time for the change to reach the points downstream of the temperature sensor 53a, which senses the DPF inlet temperature Tin, the temperatures A, B, C change in retard of the change in the DPF inlet temperature Tin. Then, the temperatures A, B, C converge to the value of the DPF inlet temperature Tin. Therefore, the temperatures inside the DPF 32 can be suitably estimated by the model expressed by the transfer function consisting of the first-order lag and the dead time.

The lag at a certain point increases as the certain point recedes from the temperature sensor 53a. Therefore, the lag is longer at the point B than at the point A and is longer at the point C than at the point B. Profiles of the changes of the temperatures A, B, C to follow the DPF inlet temperature Tin, or profiles of the following changes, are gentle due to a relatively large heat capacity of the DPF main body 4, of which base material is the ceramic. A speed of the following change at a certain point decreases as the certain point recedes downstream from the temperature sensor 53a. Therefore, the speed of the following change is lower at the point B than at the point A and is lower at the point C than at the point B. As the flow rate and the flow velocity of the exhaust gas increase, the lag shortens as a whole and the speed of the following change increases. Accordingly, the dead time L at a certain point is increased as the certain point recedes from the temperature sensor 53a, and is decreased as the flow rate of the exhaust gas increases. The time constant T at a certain point is increased as the certain point recedes from the temperature sensor 53a, and is decreased as the flow rate of the exhaust gas increases.

Thus, the temperatures A, B, C at the points A, B, C on the central axis X of the DPF main body 4 can be estimated from the temperature sensed at the point immediately upstream of the DPF 32, and the temperature distribution along the central axis X of the DPF main body 4 can be obtained. The temperatures A, B, C respectively representing the domains d1, d2, d3 are also referred to as temperatures T1, T2, T3, hereafter.

Figure 6:
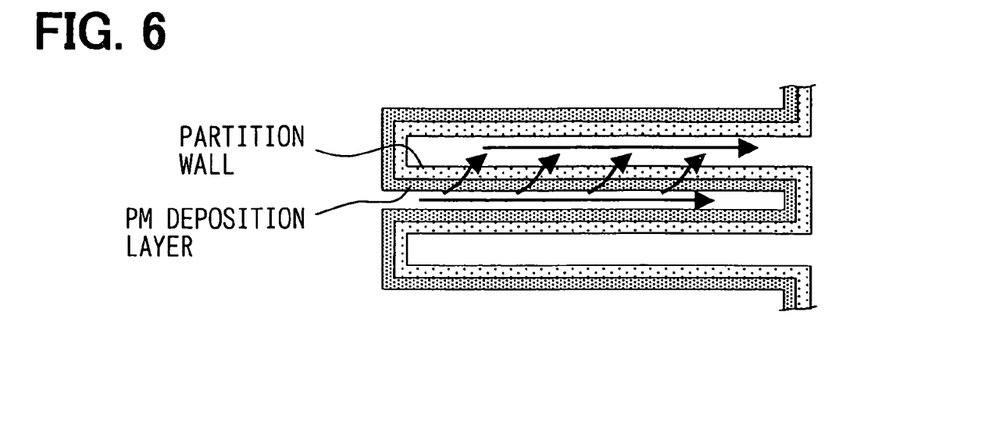
FIG. 6. is a diagram showing a flow of exhaust gas passing through the particulate filter according to the second embodiment.

A state of the exhaust gas flowing through the DPF main body 4 is shown in FIG. 6. While flowing in the direction of the central axis X along the partition wall, the exhaust gas permeates and passes through the partition wall. Then, the exhaust gas flows along the partition wall again. The area where the exhaust gas permeates the partition wall extends from the inlet 4a side to the outlet 4b side. As explained above, the volumetric flow rate of the exhaust gas depends on the temperature. Therefore, if the temperatures at the various portions of the DPF main body 4 are not uniform, the volumetric flow rate of the exhaust gas permeating the partition wall will vary in the DPF main body 4. Therefore, in the present embodiment, the temperature distribution inside the DPF main body 4 is measured and the flowing state of the exhaust gas inside the DPF main body 4 is reflected in the calculation of the PM deposition quantity ML. As a result, the PM deposition quantity ML can be calculated further accurately.

In Step S203, the viscosities $\mu$ and the densities $\rho$ of the exhaust gas in the respective domains d1, d2, d3 are calculated based on the temperatures T1, T2, T3 in the domains d1, d2, d3. More specifically, the viscosity $\mu1$ and the density $\rho1$ in the domain d1, the viscosity $\mu2$ and the density $\rho2$ in the domain d2, and the viscosity $\mu3$ and the density $\rho3$ in the domain d3 are calculated respectively based on the temperatures T1, T2, T3.

Then, in Step S204, the PM deposition quantity ML is calculated based on a following flow model of the exhaust gas. More specifically, the exhaust gas entering the DPF main body 4 divides into a part permeating the partition wall and the other part flowing downstream along the partition wall. The latter part of the exhaust gas also permeates the partition wall in the downstream area sequentially, and merges into the former part of the exhaust gas, which has already permeated the partition wall. The pressure in the DPF main body 4 is a state quantity determined by the position regardless of the history of the exhaust gas. Therefore, a large volume of the exhaust gas permeates the partition wall at a position where the permeation is easy, and a small volume of the exhaust gas permeates the partition wall at another position where the permeation is difficult, so a pressure loss (a partition wall permeation pressure loss) caused when the exhaust gas permeates the partition wall becomes uniform regardless of the position in the DPF main body 4. Thus, self-regulatory action occurs.

At that time, the deposition state of the exhaust particulate matters, which defines the partition wall permeation pressure loss, or thickness of a layer of the deposited particulate matters (a PM deposition layer) becomes uniform. Thickness of the partition wall inside the DPF main body 4 can be considered uniform. Therefore, a partition wall permeation pressure loss at the time when the PM deposition quantity ML is zero (an initial partition wall permeation pressure loss $\Delta$PDPF) is uniform regardless of the position in the DPF main body 4. Therefore, a permeation pressure loss $\Delta$PPM at the PM deposition layer is calculated by subtracting the initial partition wall permeation pressure loss $\Delta$PDPF from the measured DPF differential pressure $\Delta$P.

As described above, the temperatures T1, T2, T3 respectively represent the temperatures in the upstream domain d1, the intermediate domain d2 and the downstream domain d3 of the DPF main body 4. If the temperature is uniform in each domain, a volumetric flow rate V1 of the exhaust gas permeating the partition wall in the upstream domain d1 can be expressed by an equation (11) using a mass flow rate G1 of the exhaust gas passing through the partition wall in the domain d1 because of the self-regulatory action.

$$V1 = f(G1, T1, \Delta PPM), \tag{11}$$

Likewise, a volumetric flow rate V2 of the exhaust gas permeating the partition wall in the intermediate domain d2 can be expressed by an equation (12) using a mass flow rate G2 of the exhaust gas passing through the partition wall in the domain d2.

$$V2 = f(G2, T2, \Delta PPM), \tag{12}$$

Likewise, a volumetric flow rate V3 of the exhaust gas permeating the partition wall in the downstream domain d3 can be expressed by an equation (13) using a mass flow rate G3 of the exhaust gas passing through the partition wall in the domain d3.

$$V3 = f(G3, T3, \Delta PPM), \tag{13}$$

A total mass flow rate G of the exhaust gas is the summation of the mass flow rate G1, the mass flow rate G2 and the mass flow rate G3 (G=G1+G2+G3).

The PM deposition quantity in each domain can be expressed by the formula (4). Therefore, the total PM deposition quantity ML as the summation of the PM deposition quantities in the respective domains d1, d2, d3 can be calculated based on the mass flow rate G and the permeation pressure loss $\Delta$PPM. Thus, the PM deposition quantity ML can be calculated highly accurately even in the case where the volumetric flow rate of the exhaust gas at the DPF 32 cannot be represented by a single value.

The DPF 32 draws heat from the exhaust gas entering the DPF 32. Unburned components contained in the exhaust gas are combusted in the DPF 32. Therefore, a temperature distribution occurs along the central axis X in a direction from the inlet 4a to the outlet 4b. Therefore, arithmetic errors in the calculation of the deposition state of the exhaust particulate matters due to the heat drawn by the DPF 32 or the combustion of the unburned components contained in the exhaust gas can be inhibited.

In the present embodiment, the DPF 32 is divided into the three domains d1, d2, d3 along the central axis X. Alternatively, the DPF 32 may be divided into two domains, four domains or more.

Figure 7:
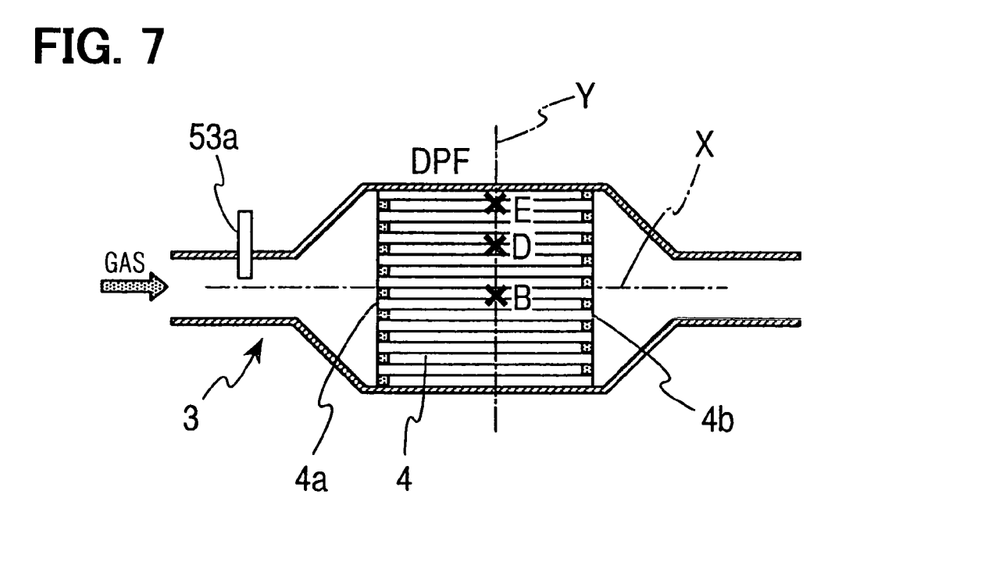
FIG. 7 is a longitudinal sectional view showing a neighborhood of a particulate filter of an exhaust gas purification system of a modified example of the second embodiment.
Figure 8:
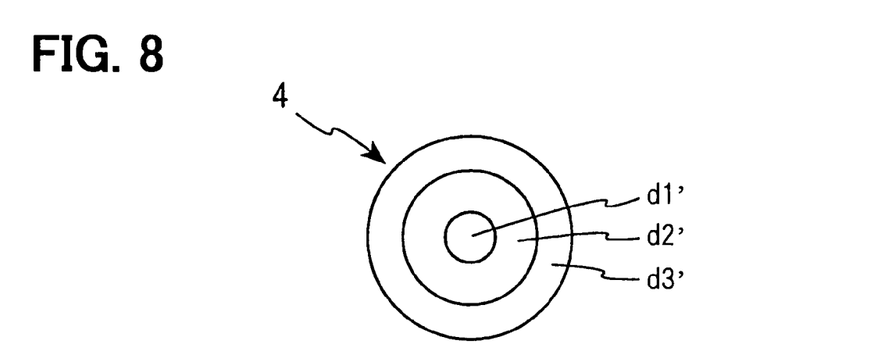
FIG. 8 is a sectional diagram showing the particulate filter of the modified example of the second embodiment.

In some cases, a temperature gradient occurs along a radial direction of the DPF main body 4 because of a difference between the ambient temperature and the temperature inside the DPF 32. The temperature at an outer peripheral portion of the DPF main body 4 becomes low because the atmosphere in which the exhaust passage 3 is disposed draws the heat from the outer peripheral portion. Therefore, as shown in FIGS. 7 and 8, the DPF main body 4 may be divided into multiple domains along the radial direction of the DPF main body 4, and points B, D, E for estimating the temperatures may be set in the respective domains. In this case, the temperatures B, D, E at the points B, D, E shown in FIG. 7 represent the temperatures in the circular or ring-shaped coaxial domains d1', d2', d3' provided coaxially with the central axis X on a transverse plane Y perpendicular to the central axis X as shown in FIG. 8. It is because a distance between the central axis X and the peripheral surface of the DPF main body 4 at which the heat is exchanged with the atmosphere is substantially uniform. The temperatures B, D, E of the respective domains d1', d2', d3' are calculated from the temperature B at the point B on the central axis X and the ambient temperature based on a map, in which the temperature B and the ambient temperature are associated with the temperatures in the respective domains, for instance. The map is prepared so that the temperature is high on the central axis X side and is low on the outer peripheral side. The temperature B is estimated from the DPF inlet temperature Tin by using the transfer function as explained above. The point B is a point suitable for estimating the temperature because the point B is the center of the DPF main body 4 with respect to the direction of the central axis X.

Thus, by calculating the PM deposition quantity ML in accordance with the distribution of the volumetric flow rate of the exhaust gas permeating the particulate wall at the respective positions of the DPF main body 4, the PM deposition quantity ML can be calculated further accurately.

The temperature distribution inside the DPF main body 4 may be estimated by setting the multiple temperature estimation points along the central axis X of the DPF main body 4 and by setting the multiple temperature estimation points along the transverse plane Y perpendicular to the axis X. Thus, a further precise temperature distribution can be obtained.

In the above embodiments, an increase in the volumetric flow rate due to the fuel injection is not considered. In some required specifications, the increase in the volume of the exhaust gas due to the combustion reaction of the fuel and the intake air may be calculated based on a fuel injection command value to obtain the volumetric flow rate of the exhaust gas.

The present invention should not be limited to the disclosed embodiments, but may be implemented in many other ways without departing from the spirit of the invention.

What is claimed is:

1. An exhaust gas purification system of an internal combustion engine, which includes a particulate filter disposed in an exhaust passage of the engine for collecting exhaust particulate matters and calculates an deposition state of the exhaust particulate matters deposited in the particulate filter based on operating states of the engine including a differential pressure between an inlet and an outlet of the particulate filter to determine whether the particulate filter should be regenerated or not, the exhaust gas purification system comprising:

absolute pressure calculating means for calculating an absolute pressure of exhaust gas at an upstream portion or inside the particulate filter;

converting means for converting a mass flow rate of the exhaust gas flowing through the particulate filter into a volumetric flow rate based on the absolute pressure; and deposition state calculating means for calculating the deposition state based on the volumetric flow rate and the differential pressure, wherein the absolute pressure calculating means includes filter downstream pressure loss calculating means for calculating a pressure loss in the exhaust passage between the outlet of the particulate filter and a tailpipe based on the operating states of the engine and a filter pressure loss calculating means for calculating a pressure loss in the particulate filter, and the absolute pressure calculating means calculates the absolute pressure by adding an atmospheric pressure, the pressure loss in the exhaust passage between the outlet of the particulate filter and the tailpipe, and the pressure loss in the particulate filter.

2. The exhaust gas purification system as in claim 1, wherein
the filter downstream pressure loss calculating means calculates the pressure loss in the exhaust passage based on an intake air flow rate of the engine and temperature in the exhaust passage downstream of the particulate filter.

3. The exhaust gas purification system as in claim 1, wherein
the filter downstream pressure loss calculating means calculates the pressure loss in the exhaust passage based on an intake air flow rate of the engine, temperature in the exhaust passage downstream of the particulate filter, and ambient temperature.

4. The exhaust gas purification system as in claim 1, wherein
the filter pressure loss calculating means calculates a pressure at a centroid of a pressure distribution between the inlet and the outlet of the particulate filter as the pressure loss in the particulate filter by multiplying the differential pressure between the inlet and the outlet of the particulate filter by a coefficient, which is greater than zero and is equal to or less than one.

5. A method for operating an exhaust gas purification system which includes a particulate filter disposed in an exhaust passage of an internal combustion engine and which system monitors accumulation of exhaust particulate matters deposited in the particulate filter based on operating states of the engine including a differential pressure between an inlet and an outlet of the particulate filter to determine whether the particulate filter should be regenerated or not, the method comprising:

calculating an absolute pressure of exhaust gas at an upstream portion or inside the particulate filter by adding atmospheric pressure, pressure loss in an exhaust passage between the outlet of the particulate filter and the tailpipe, and pressure loss in the articulate filter;

converting a mass flow rate of the exhaust gas flowing through the particulate filter into a volumetric flow rate based on the absolute pressure; and calculating a deposition state based on the volumetric flow rate and the differential pressure, wherein pressure loss in the exhaust passage between the outlet of the particulate filter and a tailpipe is calculated based on operating states of the engine and a calculated filter pressure loss in the particulate filter.

6. A method as in claim 5 wherein:
the pressure loss in the exhaust passage is calculated based on intake air flow rate of the engine and temperature in the exhaust passage downstream of the particulate filter.

7. A method as in claim 5 wherein:
the pressure loss in the exhaust passage is calculated based on intake air flow rate of the engine, temperature in the exhaust passage downstream of the particulate filter, and ambient temperature.

8. A method as in claim 5 wherein:

a pressure at a centroid of a pressure distribution between the inlet and the outlet of the particulate filter is calculated as pressure loss in the particulate filter by multiplying differential pressure between the inlet and outlet of the particulate filter by a coefficient which is greater than zero and equal to or less than one.

* * * * *